2,828,296
Patented Mar. 25, 1958

2,828,296

EMULSIFIABLE POLYPROPYLENE WAX AND MANUFACTURE THEREOF

James E. Guillet, Kingsport, Tenn., assignor to Eastman Kodak Company, Rochester, N. Y., a corporation of New Jersey No Drawing. Application February 11, 1957
Serial No. 639,188

10 Claims. (Cl. 260—93.7)

This invention relates to high-melting synthetic waxes which are readily emulsifiable and to the manufacture of such waxes and is particularly concerned with certain specific waxes derived from polypropylene.

In my copending application Serial No. 639,189, filed February 11, 1957, certain high-melting and extremely hard synthetic waxes are disclosed which result from thermal treatment of highly crystalline and high molecular weight polypropylene to give waxy products having an average molecular weight in the range of 1000–8000, acid numbers of substantially zero, densities of at least 0.90, ball and ring softening points of at least 130° C. and hardness characteristics exceeding those of carnauba wax. These waxes are non-emulsifiable and are characterized by the combination of very high melting point and very great hardness coupled with a low melt viscosity.

As set out in such copending application, polypropylene waxes cannot be formed directly by polymerization of propylene monomer to the molecular weight range of 1000–8000, since the products thereby obtained are liquids or semisolids. Furthermore, heating of the high molecular weight solid polypropylenes at temperatures of the order of 150–170° C. gives viscous oils or semi-solids which are totally useless as waxes. Thus, the synthetic waxes defined in the copending application are not only unique because of their unusual combination of physical properties but also are unique in having an average molecular weight wherein waxy products are not possible when prepared by other processes.

Although the non-emulsifiable high-melting synthetic waxes from polypropylene have great utility in many applications such as many wax formulations, protective coatings, varnishes and the like, it is also desirable for many uses to have available a readily emulsifiable high-melting synthetic wax which has good flow characteristics in the melt. This is particularly the case where wax formulations employ blends of two or more synthetic or naturally occurring waxes with or without the addition of other compounding materials.

It is accordingly an object of this invention to provide new and improved high-melting synthetic waxes which are readily emulsifiable and which are compatible with the usual naturally occurring or synthetic waxes now known to the trade.

Another object of the invention is to provide a new and improved method for obtaining such high-melting emulsifiable synthetic waxes.

Another object of the invention is to provide commercially feasible processes for preparing such emulsifiable high-melting synthetic waxes and in particular to provide processes whereby the characteristics of the wax product can be varied over a considerable range depending upon the exact combination of characteristics desired.

Other objects will be apparent from the description and claims which follow.

These and other objects are attained by means of this invention wherein synthetic waxes which are readily emulsifiable and which have ASTM D36–26 ball and ring softening points of at least 130° C. and which give hard, glossy, self-polishing films when spread in emulsion form are prepared by reacting a non-emulsifiable polypropylene wax having an average molecular weight in the range of 1000–8000, a density of at least 0.90, an ASTM D36–26 ball and ring softening point of at least 130° C. and an acid number of substantially zero, with oxygen at a temperature of 100–200° C. until the acid number of the resulting product is in the range of 2–20, and desirably within the range of 5–20. The materials used for conversion to the emulsifiable waxes embodying this invention are polypropylene waxes which result from the thermal treatment of highly crystalline polypropylene having an average molecular weight above 10,000 and usually above 20,000, and densities of at least 0.90, at 300–450° C. in the absence of substantial amounts of oxygen until the molecular weight is reduced to within the range of 1000–8000. The preparation of these materials is disclosed and claimed in my copending application Serial No. 639,189 filed February 11, 1957, and any of the non-emulsifiable high-melting waxes therein disclosed or similar high-melting polypropylene waxes having an acid number of substantially zero can be used as starting materials in the processes of the present invention.

The waxes embodying the present invention have average molecular weight values within the range of 1000–8000 and have softening points of at least 130° C. Although the melt viscosity of the materials embodying the present invention is not as low as the melt viscosities of the non-emulsifiable polypropylene waxes from which the present materials are obtained, the melt viscosity of the materials of this invention is in the medium range so that these materials are readily employed in melt processes. Furthermore, the ready emulsifiable character of the waxes of this invention makes the melt viscosity of less importance since they are usually used in the form of an emulsion rather than being applied in the form of a melt. The emulsifiable waxes can be prepared merely by reaction with oxygen at temperatures of 100–200° C., either by introducing air into the non-emulsifiable wax in liquid form (i. e. either in molten form or in solution in a suitable solvent) or by adding a source of oxygen such as by adding hydrogen peroxide to the reaction mixture. When the reaction is carried out in the presence of oxygen but in the absence of other added catalysts, the reaction is relatively slow and involves a rather long induction period. Consequently, it is desirable to effect the oxidation reaction in the presence of an organic peroxide catalyst which greatly reduces the reaction period. In many cases, it is also desirable to have an alkali metal carbonate present also since it has been found that the alkali metal carbonates tend to increase the hardness of the resulting emulsifiable products as well as facilitating the conversion of the non-emulsifiable wax to the emulsifiable form. Another advantage of the use of alkali metal carbonates is that waxes having acid numbers in the range of 2–5 are readily emulsifiable whereas, in the absence of the alkali metal carbonate, the acid value of the waxy product is preferably within the range of 5–20 for ready emulsification.

The oxidation reaction of this invention can be carried out with the non-emulsifiable polypropylene wax in bulk or in dispersion in a suitable solvent at temperatures ranging from 100 to 200° C. In order to introduce oxygen into the wax being converted during the course of the heating, it is necessary to have the wax in liquid form. This can be readily accomplished by dissolving the wax in a suitable hydrocarbon solvent, since the non-emulsifiable polypropylene waxes are readily soluble in most of the common aliphatic and aromatic hydrocarbon solvents. When a solution of the non-emulsifiable polypropylene wax is used, temperatures below the melting point of the wax are wholly feasible provided such temperatures are above 100° C. Usually, however, it is more convenient to effect the process with the non-emulsifiable polypropylene wax in molten form rather than in solution in a solvent. In such cases, the reaction is carried out at temperatures between the melting point of the polypropylene wax being converted and 200° C. In either case, oxygen is conveniently introduced into the liquid reaction system merely by bubbling air into the reaction mixture, although oxygen can be introduced by other methods such as by addition of hydrogen peroxide or other material which yields gaseous oxygen under the conditions of the reaction. If desired, the oxidation reaction can be carried out in the presence of other additives and particularly in the presence of other waxes such as paraffin wax, polyethylene wax, carnauba wax, or similar naturally occurring or synthetic waxes which may be desirable in order to control or modify the hardness characteristics of the resulting emulsifiable wax composition. The presence of such other waxes in the reaction mixture does not affect the course of the reaction, and consequently it is entirely feasible to make emulsifiable wax blends in a single step rather than first preparing the emulsifiable wax of this invention and then blending it with such other waxes.

As has been indicated, the course of the reaction is facilitated by the presence of a peroxide catalyst which can be any of the well known organic peroxides or similar peroxy compounds such as cumene hydroperoxide, ditertiarybutyl peroxide, benzoyl peroxide, or other peroxy catalysts such as are commonly employed in the polymerization art. The nature of the peroxide catalyst does not appear to be critical. Consequently, the invention is not limited to the use of any particular organic peroxide as catalyst. Similarly, the amount of catalyst employed is not a critical factor, although concentrations of from about 0.1% to about 2% by weight based on the weight of the non-emulsifiable polypropylene wax are usually employed for optimum results, although higher concentrations such as concentrations of as much as 5% or more can be used without deleterious effects. The use of such higher concentrations does not materially aid in the reaction, and is therefore not preferred for economic reasons.

In some cases it is also desirable to effect the oxidation in the presence of a catalytic amount of an alkali metal carbonate. The preferred carbonate is sodium carbonate from the economic standpoint, but the other alkali metal carbonates such as potassium carbonate and lithium carbonate can be used with excellent results if desired. The presence of the carbonate in the reaction mixture has a two-fold effect in that the carbonate appears to increase the hardness of the resulting product and also increases its emulsifying characteristics. Thus, a wax prepared in the presence of alkali metal carbonate will be more readily emulsifiable at a given acid number than will a wax which has been prepared in the absence of the alkali metal carbonate. As with the peroxide catalyst, the concentration of the alkali metal carbonate is not critical, and concentrations of from about 0.1% to about 2% by weight based on the weight of the wax being converted are usually employed, although higher or lower concentrations can be used if desired depending upon the characteristics desired in the final product.

The reaction time will depend upon a number of variable factors but normally is between 1 and 14 hours. The reaction time is affected by the properties of the non-emulsifiable polypropylene wax being converted, the temperature, the presence or absence of catalyst or catalysts, the concentration of such catalyst or catalysts, and similar variable factors. The time actually employed is usually determined by the acid number desired for the resulting product, and the oxidation is continued until the resulting product has an acid number in the range of 2–20 and preferably in the range of 5–20.

The synthetic waxes obtained in accordance with the invention are characterized by having medium melt viscosities, average molecular weights within the range of 1000–8000, acid numbers of 2–20, ball and ring softening points of at least 130° C., and penetration hardness values (ASTM D5–52) of the order of 5–15 at 250 g. load for 5 seconds. This is in contrast to the non-emulsifiable polypropylene waxes employed as starting materials since the waxes employed in practicing the invention have densities of at least 0.90, average molecular weights of 1000–8000, melting points in excess of 130° C. and usually of at least 140° C., low melt viscosities, acid numbers of substantially zero, and penetration hardness values of below 2 at 250 g. load for 5 seconds. In addition, the polypropylene waxes employed as starting materials are non-emulsifiable whereas those embodying the present invention are readily emulsifiable. The hardness of the waxes embodying the present invention can be varied subsequent to the oxidation by heating under vacuum which not only improves the hardness of the composition but also removes any low boiling products which might cause odor. If desired, similar improvements can be obtained by extraction of the waxy product with solvents such as methanol, ethanol, hexane, heptane, or the like, or mixtures of such solvents. As has been indicated previously, improved hardness values are obtained by carrying out the oxidation in the presence of alkali metal carbonates. In the manufacture of the waxy product embodying this invention, it is often desirable to pour the molten reaction product into vigorously agitated methanol or similar non-solvent for the wax whereby the product is obtained in the form of a powder and such low boiling products are also removed.

The invention is illustrated by the following examples of certain preferred embodiments thereof, although it will be understood that such examples are merely illustrative and not intended to limit the scope of the invention unless otherwise specifically indicated.

EXAMPLE 1

In a typical process, 200 parts by weight of crystalline polypropylene wax having a molecular weight of 4000 and resulting from the heating of highly crystalline polypropylene at temperatures of 350–450° C. were melted in a reactor provided with an agitator and a bubbler for introduction of air into the melt. After the non-emulsifiable wax had been melted, 2 parts by weight of ditertiarybutyl peroxide catalyst was added, and air was bubbled into the melt at the rate of 340 volumes per minute for 2 hours while the reaction mixture was maintained at 160° C. Exit gases were passed from the top of the reactor through a water-cooled condenser and bubbled into a 3-inch head of water whereby a slight pressure was maintained in the reactor. The agitator was revolved at a rapid rate during the reaction to ensure thorough mixing of the air with the wax melt. The resulting waxy product was then poured while molten into 500 volumes of methanol with vigorous stirring to give 185 g. of emulsifiable wax in the form of a powder. This product had an acid number of 9 and a molecular weight of 2400. It was readily emulsified to give a transparent wax emulsion which produced a high gloss without rubbing or buffing.

EXAMPLE 2

The process described in the preceding example was again duplicated except that 2 parts by weight of anhydrous sodium carbonate was added with the peroxide catalyst. The reaction was carried out for 12 hours at 180° C. The resulting waxy product had an acid number of 5.5 and a molecular weight of 3000. Even though the acid number of the product was considerably lower than that of the product of the preceding example, this product also emulsified very readily and gave coatings of high gloss which required no rubbing or buffing. Both products exhibited softening points above 130° C., and the product of Example 2 wherein the alkali metal carbonate was used showed particularly good hardness so that the films prepared therefrom showed unusually good resistance to scuffing and abrasion.

EXAMPLE 3

The process of the invention can be readily effected using mixtures of the crystalline non-emulsifiable polypropylene wax with other waxes which are commonly used to modify the characteristics of the formulation. Thus, 140 parts by weight of non-emulsifiable polypropylene wax having an average molecular weight of about 4000 and a density of about 0.91 was mixed with 60 parts by weight of paraffin wax and melted together at 160° C. Di-tertiarybutyl peroxide catalyst was added at a concentration of about 1% based on the combined weight of the waxes, and the mixture was heated at 160° C. with air bubbling through the melt for 2 hours. The resulting wax blend had an acid number of 7.4 and a molecular weight of 2200. This blend was also readily emulsifiable and was an excellent coating material.

EXAMPLE 4

In similar fashion, a blend was prepared of 160 parts by weight of crystalline non-emulsifiable polypropylene wax and 40 parts by weight of emulsifiable polyethylene wax (Epolene N polyethylene wax). The procedure of Example 1 was used including the peroxide catalyst, and the resulting wax blend had an acid number of 6 and a molecular weight of 3200.

EXAMPLE 5

Although the process of the invention is desirably carried out with the wax in molten form, it can also be carried out in solvent medium, in which case somewhat lower temperatures can be used. Thus, 200 parts by weight of crystalline polypropylene wax having a molecular weight of 4000 and an acid number of substantially zero was dissolved in 50 volumes of nitro benzene, and the wax was oxidized by bubbling air through the solution for 6 hours at 140° C. The resulting waxy product had an acid number of 5.7, a molecular weight of 3500, and was readily emulsifiable to give a transparent wax emulsion which likewise produced high-gloss coatings which required no buffing or rubbing.

The properties of other synthetic waxes which embody the invention are shown in Table 1 and compared with the same properties for other waxes. In Table 1, the waxes of this invention are designated as Oxidized Polypropylene Wax, and such materials were prepared by effecting the oxidation as described herein using a catalytic mixture of organic peroxide and sodium carbonate. As can be seen from the table, the acid number of the waxy products was only 2, but the products were readily emulsifiable.

*Table 1*

| Wax | Softening Point, °C.[1] | Melt Viscosity | Penetration Hardness[2] | | Acid No. |
|---|---|---|---|---|---|
| | | | 100 g./5 sec. | 250 g./5 sec. | |
| Emulsifiable polyethylene wax (Epolene E) | 103 | High | 1 | 5.5 | 10 |
| Non-emulsifiable polyethylene wax (Epolene N) | 105 | High | 0-1 | 7.5 | 0 |
| Carnauba Wax | 85 | Low | 0 | 6 | 10.6 |
| Non-emulsifiable polypropylene wax | 140 | Low | 0 | 1.5 | 0 |
| Do | 164 | Low | 0 | 1.0 | 0 |
| Oxidized Polypropylene wax | 139 | Medium | | 12 | 2 |
| Do | 141 | Medium | | 9 | 2 |

[1] ASTM D36-26.
[2] ASTM D5-52.

Thus by means of this invention high-melting emulsifiable synthetic waxes which are very useful in wax formulations, protective coatings, and the like, either alone or in blends with other synthetic or naturally occurring waxes, are readily prepared by a process which is easily adapted to plant practice. The emulsifiable waxes have much higher softening points than do either carnauba wax or the emulsifiable polyethylene waxes which have the highest melting point of any of the commercially available emulsifiable waxes. In addition, the medium melt viscosity characteristics of the waxes embodying this invention make them readily adaptable for use in coating processes from the melt and also make them readily adaptable for blending with other materials.

Although the invention has been described in detail with particular reference to certain preferred embodiments thereof, variations and modifications can be effected within the spirit and scope of this invention as described hereinabove and as defined in the appended claims.

I claim:

1. The method of making an emulsifiable high-melting synthetic wax which comprises reacting a non-emulsifiable polypropylene wax having an average molecular weight in the range of 1000–8000, a density of at least 0.90, a ball and ring softening point of at least 130° C. and an acid number of substantially zero, with oxygen at a temperature of 100–200° C. until the acid number of the resulting product is in the range of 2–20.

2. The method of making an emulsifiable high-melting synthetic wax which comprises reacting a non-emulsifiable polypropylene wax having an average molecular weight in the range of 1000–8000, a density of at least 0.90, a ball and ring softening point of at least 130° C. and an acid number of substantially zero, with oxygen at a temperature of 100–200° C. and in the presence of an organic peroxide catalyst until the acid number of the resulting product is in the range of 2–20.

3. The method of making an emulsifiable high-melting synthetic wax which comprises reacting a non-emulsifiable polypropylene wax having an average molecular weight in the range of 1000–8000, a density of at least 0.90, a ball and ring softening point of at least 130° C. and an acid number of substantially zero, with oxygen at a temperature of 100–200° C. and in the presence of a catalytic mixture of an organic peroxide and an alkali metal carbonate until the acid number of the resulting product is in the range of 2–20.

4. The method which comprises heating at 100–200° C. a mixture, in the liquid state, of a non-emulsifiable polypropylene wax having an average molecular weight in the range of 1000–8000, a density of at least 0.90, a ball and ring softening point of at least 130° C. and an acid number of substantially zero, and an organic peroxide catalyst while introducing air into said mixture, said heating being continued until the resulting product has an acid number in the range of 5–20.

5. The method which comprises heating a non-emulsifiable polypropylene wax having an average molecular weight in the range of 1000–8000, a density of at least 0.90, a ball and ring softening point of at least 130° C. and an acid number of substantially zero, at a temperature above the melting point of said wax but not above 200° C. and in the presence of a catalytic mixture of an organic peroxide and an alkali metal carbonate, while introducing air into the molten wax, said heating being continued until the resulting product has an acid number in the range of 5–20.

6. The method which comprises heating a non-emulsifiable polypropylene wax having an average molecular weight in the range of 1000–8000, a density of at least 0.90, a ball and ring softening point of at least 130° C. and an acid number of substantially zero, at a temperature above the melting point of said wax but not above 200° C. and in the presence of di-tertiarybutyl peroxide catalyst, while introducing air into the molten wax, said heating being continued until the resulting product has an acid number in the range of 5-20.

7. The method which comprises heating a non-emulsifiable polypropylene wax having an average molecular weight in the range of 1000-8000, a density of at least 0.90, a ball and ring softening point of at least 130° C. and an acid number of substantially zero, at a temperature above the melting point of said wax but not above 200° C. and in the presence of a catalytic mixture of di-tertiary butyl peroxide and sodium carbonate, while introducing air into the molten wax, said heating being continued until the resulting product has an acid number in the range of 5-20.

8. An emulsifiable oxidized polypropylene wax having an average molecular weight in the range of 1000-8000, a ball and ring softening point above 130° C., and an acid number in the range of 2-20, said wax being the product obtained by reacting a non-emulsifiable polypropylene wax having an average molecular weight of 1000-8000, a density of at least 0.90, a ball and ring softening point above 130° C. and an acid number of substantially zero, with oxygen at a temperature of 100-200° C. for a time sufficient to develop an acid number of 2-20.

9. An emulsifiable oxidized polypropylene wax having an average molecular weight in the range of 1000-8000, a ball and ring softening point above 130° C., and an acid number in the range of 5-20, said wax being the product obtained by reacting a non-emulsifiable polypropylene wax having an average molecular weight of 1000-8000, a density of at least 0.90, a ball and ring softening point above 130° C. and an acid number of substantially zero, with oxygen at a temperature of 100-200° C. and in the presence of an organic peroxide catalyst, for a time sufficient to develop an acid number of 5-20.

10. An emulsifiable oxidized polypropylene wax having an average molecular weight in the range of 1000-8000, a ball and ring softening point above 130° C., and an acid number in the range of 5-20, said wax being the product obtained by reacting a non-emulsifiable polypropylene wax having an average molecular weight of 1000-8000, a density of at least 0.90, a ball and ring softening point above 130° C. and an acid number of substantially zero, with oxygen at a temperature of 100-200° C. and in the presence of a catalytic mixture of an organic peroxide and an alkali metal carbonate, for a time sufficient to develop an acid number of 5-20.

References Cited in the file of this patent

UNITED STATES PATENTS 2,372,001    Joyce  ---------------- Mar. 20, 1945

FOREIGN PATENTS 538,782    Belgium  -------------- Dec. 16, 1955